US011599456B2

(12) United States Patent
Hk et al.

(10) Patent No.: US 11,599,456 B2
(45) Date of Patent: Mar. 7, 2023

(54) AUTOMATED VALIDATION OF A REST APPLICATION PROGRAMMING INTERFACE

(71) Applicant: EMC IP Holding Company LLC, Hopkinton, MA (US)

(72) Inventors: Nagendra Hk, KA (IN); Poornima Gokhale, Chamarajnagar (IN); Abhijit R. Bangera, Mangalore (IN); Srinivasa Raju Chamarthy, Karnataka (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 95 days.

(21) Appl. No.: 17/370,816

(22) Filed: Jul. 8, 2021

(65) Prior Publication Data
US 2022/0382669 A1 Dec. 1, 2022

(30) Foreign Application Priority Data
May 27, 2021 (IN) .............................. 202111023709

(51) Int. Cl.
*G06F 11/36* (2006.01)
*G06F 9/54* (2006.01)
(52) U.S. Cl.
CPC .......... *G06F 11/3688* (2013.01); *G06F 9/541* (2013.01); *G06F 11/3684* (2013.01)
(58) Field of Classification Search
CPC ................. G06F 11/36; G06F 11/3688; G06F 11/3684
See application file for complete search history.

(56) References Cited

U.S. PATENT DOCUMENTS

| 8,745,641 B1* | 6/2014 | Coker ................. G06F 11/3668 719/318 |
| 2009/0235349 A1* | 9/2009 | Lai ........................ H04L 9/3271 726/10 |
| 2012/0311392 A1* | 12/2012 | Agrawal ................. G06F 11/36 714/738 |
| 2015/0074256 A1* | 3/2015 | Li ............................. G06F 8/10 709/223 |
| 2021/0240600 A1* | 8/2021 | Larosa ................ G06F 11/3664 |
| 2022/0100642 A1* | 3/2022 | Danthuluri .......... G06F 11/3688 |
| 2022/0109665 A1* | 4/2022 | Erra ........................ G06F 9/547 |
| 2022/0121562 A1* | 4/2022 | Kumar ................ G06F 11/3696 |

* cited by examiner

*Primary Examiner* — Kamini B Patel
(74) *Attorney, Agent, or Firm* — Amin, Turocy & Watson, LLP

(57) ABSTRACT

A system can system can parse a first group of dependencies within a first API, and second group of dependencies between the first API and a second API. The system can identify a group of assertions for the first API. The system can identify a group of validations for the first API. The system can identify a format for calls to the first API according to a first programming language based on a template for the first programming language. The system can generate a number of test cases that invoke the first API according to the first programming language based on the first group of dependencies, the second group of dependencies, and the format for calls to the first API. The system can invoke the first API with the test cases to validate functionality of the first API based on the group of assertions and the group of validations.

20 Claims, 11 Drawing Sheets

300

```
Description: Attributes for the create operation.
type: object
required: [nas_server_id, ip_address, prefix_length]
properties:
nas_server_id:
type: string
description: Unique identifier of the NAS server to which the network interface
belongs, as defined by the nas_server resource type.
ip_address:
type: string
format: ip-address
minLength: 1
maxLength: 45
```

```
{
"testbed": {
        "file_interface": {
                "ip_address": {
                        "path": "trident_sdnas_interface",
                        "value": "ipv4_address"
                },
                "prefix_length": {
                        "path": "trident_sdnas_interface",
                        "value": "prefix_length"
                },
                "gateway": {
                        "path": "trident_sdnas_interface",
                        "value": "ipv4_gateway"
                },
        },
}
```

```
{
"NasServer": "",
"FileInterface": "NasServer",
"FileSystem": "NasServer ",
"snapshot": "NasServer, FileSystem",
"NfsServer": "NasServer",
"FileLdap": "NasServer",
"FileDns": "NasServer",
"SmbServer": "NasServer, FileSystem"
},
```

```
###### START: Test Scenario 1 ############
self.file_interface_params = FileInterfaceParam()
self.file_interface_params.set_params(vlan_id = "vlan",
     ip_address = "ip_address",
     prefix_length = "prefix_length" )
     self.objects_dict =
self.object_creator.trident_object_creator(nas_server_params=self.nas_server_para
ms
file_interface_params = self.file_interface_params)
LOGGER.info(self.objects_dict)
self.objects_dict["file_interface"].delete()
###### END: Test Scenario ############

###### START: Test Scenario 2 ############
self.file_interface_params = FileInterfaceParam()
     self.file_interface_params.set_params(ip_address = "ip_address",
     gateway = gateway",
     prefix_length = "prefix_length" )
     self.objects_dict =
self.object_creator.trident_object_creator(nas_server_params=self.nas_server_para
ms,
     file_interface_params = self.file_interface_params)
     LOGGER.info(self.objects_dict)
     self.objects_dict["file_interface"].delete()
###### END: Test Scenario ############
```

FIG. 7

AUTOMATED VALIDATION OF A REST APPLICATION PROGRAMMING INTERFACE

RELATED APPLICATION

The subject patent application claims priority to Indian Provisional Patent Application No. 202111023709, filed May 27, 2021, and entitled "Automated Validation of a REST Application Programming Interface," the entirety of which provisional application is hereby incorporated by reference herein.

BACKGROUND

An application programming interface (API) can define a set of operations that can invoke commands to a computer system. A representational state transfer API (REST API) can comprise an API that that follows certain design principles, such as being stateless, offering caching, and providing a layered system architecture.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can parse a first group of dependencies within a first API. The system can parse a second group of dependencies between the first API and a second API. The system can identify a group of assertions for the first API. The system can identify a group of validations for the first API. The system can identify a format for calls to the first API according to a first programming language based on a template for the first programming language. The system can generate a number of test cases that invoke the first API according to the first programming language based on the first group of dependencies, the second group of dependencies, and the format for calls to the first API. The system can invoke the first API with the test cases to validate functionality of the first API based on the group of assertions and the group of validations.

An example method can comprise determining, by a system comprising a processor, a group of intra-dependencies within a first API. The method can further comprise determining, by the system, a group of inter-dependencies between the first API and a second API. The method can further comprise ascertaining, by the system, a group of assertions for the first API. The method can further comprise ascertaining, by the system, a group of validations for the first API. The method can further comprise generating, by the system, a defined number of test cases that invoke the first API based on the group of intra-dependencies, and the group of inter-dependencies. The method can further comprise invoking, by the system, the first API with the test cases to verify functionality of the first API based on the group of assertions and the group of validations.

An example non-transitory computer-readable medium can comprise instructions that, in response to execution, cause a system comprising a processor to perform operations. These operations can comprise determining intra-dependencies within a first API. These operations can further comprise determining inter-dependencies between the first API and a second API. These operations can further comprise ascertaining assertions for the first API. These operations can further comprise ascertaining validations for the first API. These operations can further comprise generating a predetermined number of test cases that invoke the first API based on the intra-dependencies, the inter-dependencies. These operations can further comprise invoking the first API with the test cases to verify functionality of the first API based on the assertions and the validations.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates an example API definition to facilitate automated validation of a REST API, in accordance with an embodiment of this disclosure;

FIG. 4 illustrates an example rule definition to facilitate automated validation of a REST API, in accordance with an embodiment of this disclosure;

FIG. 6 illustrates an example dependencies definition to facilitate automated validation of a REST API, in accordance with an embodiment of this disclosure;

FIG. 7 illustrates example test case to facilitate automated validation of a REST API, in accordance with an embodiment of this disclosure;

DETAILED DESCRIPTION

Overview

Figure 1:
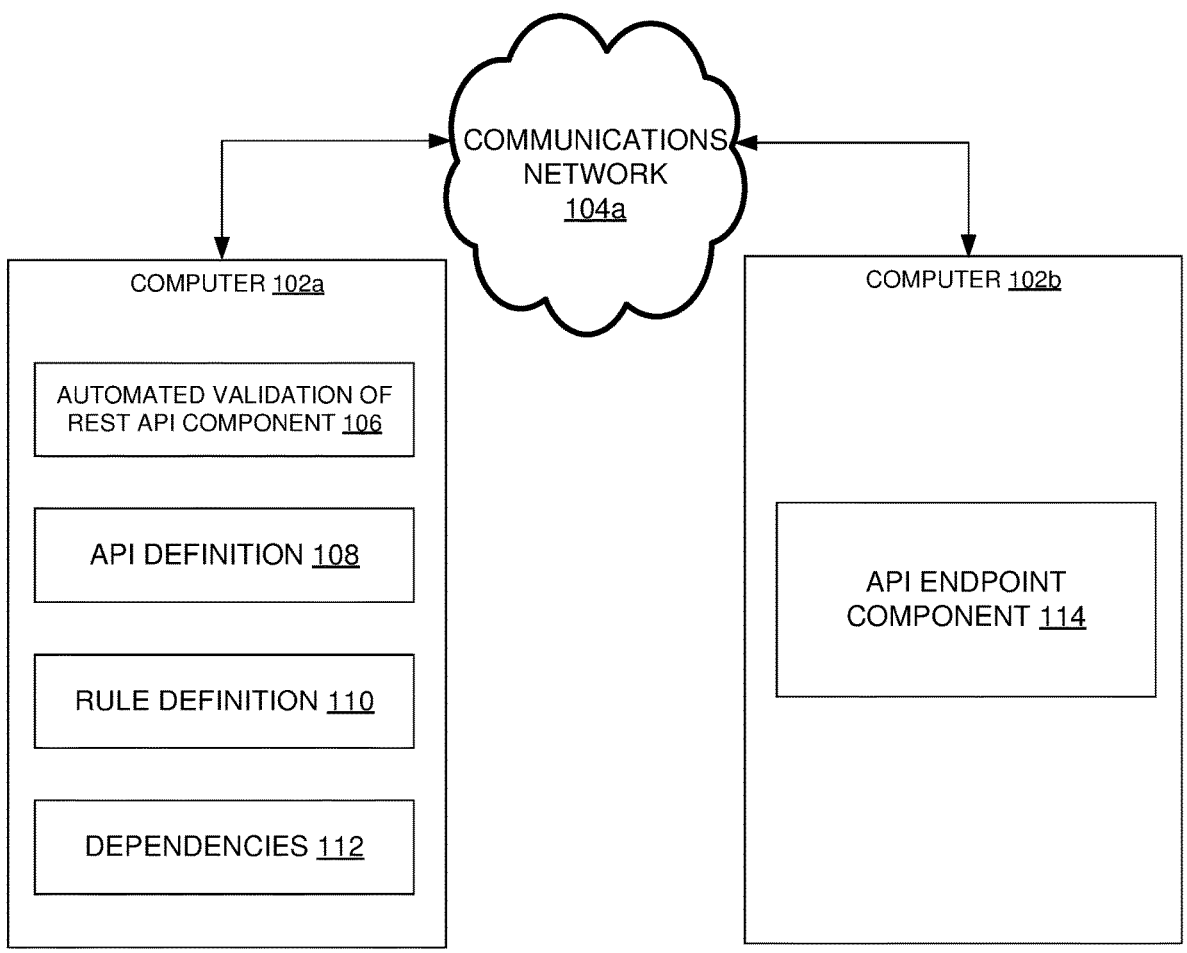
FIG. 1 illustrates an example system architecture that can facilitate automated validation of a REST API, in accordance with an embodiment of this disclosure.

Testing a REST API can be challenging, where a REST API is dense because of a large number of attributes and end points. Testing a REST API manually can be mundane, repetitive, and time consuming Some approaches to testing a REST API can involve forming static combinations of test scenarios, where a test developer includes varied permutations and combinations statically. With more products and solutions being implemented via a web-based REST API, there is an increased demand for exhaustive testing of an API quickly and efficiently with predictive validations, assertions, and workflows.

Additionally, with an increasing number of APIs and web implementations, there can be an increasing number of inter-dependencies between various APIs, and intra-dependencies within an API for attributes. It can be that these dependencies are neither well-defined nor presented in a defined machine-readable format.

With newer implementations in products, there can be an increased number of end points, and multiple web operations (e.g., create, read, update, delete (CRUD) operations) that are to be tested during tested development, and there can be no single way of validating or designing tests. Prior approaches to testing that are provided through tools can require manual development of testing scenarios.

It can also be time-consuming for developers to fully verify a developed end point (which can be a point of entry to access an API, such as an address for a server with a corresponding port) or REST definition, which can involve complete static use case development.

In sum, test development to validate REST end points to full coverage with existing available tool sets can be an exhausting process; many APIs cannot be tested or executed on their own as they can require other pre-requisite objects as dependencies; within a single API, there can be many attributes that have intra-dependencies on other attributes, which are not well-defined, and/or are not defined in a machine-readable format; there can be delays in validating developed REST methods due to a static nature of tests that are developed; and there is not a method or tool set available for testing with required assertions to be made with varied permutations and combinations to be validated.

For example, REST endpoint attributes can have different operations (CRUD operations, etc.), attribute data types, data length, data range, mandatory, optional, and required parameters, response codes (e.g., a hypertext transfer protocol (HTTP) three-digit response code that indicates whether performing the API call was successful), and output validations. To sufficiently combine these aspects for validation can lead to a large set of scenarios that would need to be manually or statically test coded in prior approaches.

A solution to these problems of testing a REST API can involve intelligently parsing an API definition from its source, and automatically generating executable scripts that provide testing coverage with permutations and combinations of the attributes. In addition to parsing definitions, there can be inter-dependencies and intra-dependencies, so such a solution can involve managing these dependencies in a script parse-able, pre-defined format. A definition of dependencies can be derived from two types of files. Intra-API dependencies can be defined in a Ruleset JavaScript Object Notation (JSON) document. Then, Inter-API dependencies can be defined in a Dependency-Set JSON document.

In some examples, REST definitions can be defined in a generic YAML Ain't Markup Language (YAML) format. These definitions can have an underlying structure that can be programmatically parsed through. These definitions can be considered to be a single source of truth with respect to their own metadata for validations and assertions, so they can be directly used in providing an end-to-end verification without using external logic (e.g., a definition attribute and a corresponding assertion can be read from the same definition). Assertions for an attribute can include information such as: supported properties and methods; data type; attribute value length; attribute value range or boundary; mandatory attributes and optional attributes; response codes for each type of response, and attribute dependency.

This metadata can be utilized in attaining a sufficient number of permutations and combinations of verifiable test cases that can be automatically generated with required assertions and validations, along with parsing dependency and rule sets for the API. Generated scripts can be utilized for execution and validation of the API. These techniques can be used to try to obtain maximum test coverage. To achieve continued improvements, learning techniques can be utilized to continuously study and evaluate outcomes from the generated test cases to provide ways to maximize coverage, minimize duplications, understand corner cases, and provide analytics data to developers and testers to continuous improvement of the API.

Permutations and combinations of attributes can be derived from the following approaches, among others: combinations of mandatory and optional parameters, and their assertions for different combinations of response codes; combinations of mandatory and optional parameters and their assertions for positive and negative values; combinations of positive and negative values for data types and their length and boundary conditions; and combinations of positive and negatives for dependent attributes.

Advantages of the present techniques can include, providing for an agnostic way of implementation that can be used to validate general REST APIs; easy integration into product code builds for unit and mock tests; a left shift of tests at a unit or functional level can be attained more easily to provide for quick smoke and sanity validations; a faster validation and verification of a new API, and continued integration validation of an existing API; a faster validation of API changes; an increased frequency of validations with utilizations of existing combinations or regenerations of combinations; and a reduction in test and development cycles, leading to a higher utilization of test and development assets.

In addition to these advantages, there can be financial and return-on-investment benefits to implementing the present techniques, in terms of reduced effort in developing and executing API tests, a reduction of equipment and infrastructure requirements for continuous integration and continuous development efforts by increased utilization of infrastructure and improved quality of a product API.

Example Architectures

FIG. 1 illustrates an example system architecture 100 that can facilitate automated validation of a REST API, in accordance with an embodiment of this disclosure.

System architecture 100 comprises computer 102a, computer 102b, and communications network 104. In turn, computer 102a comprises automated validation of REST API component 106, API definition 108, rule definition 110, and dependencies definition 112. Additionally, in turn, computer 102b comprises API endpoint component 114.

Figure 11:
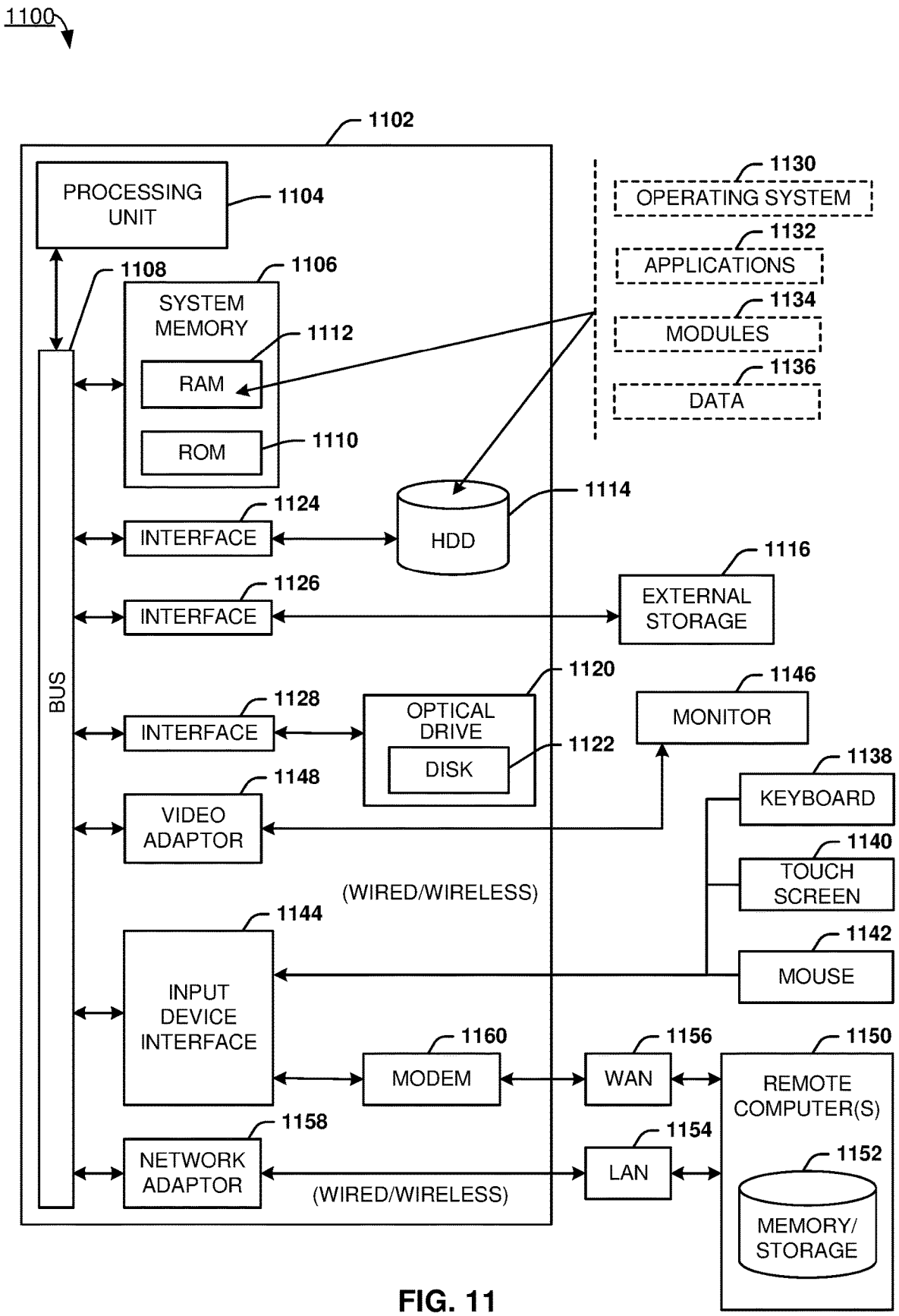
FIG. 11 illustrates an example block diagram of a computer operable to execute an embodiment of this disclosure.

In some examples, each of computer 102a and computer 102b can be implemented with one or more instances of computer 1102 of FIG. 11.

Communications network 104 can comprise a computer communications network, such as the Internet, or an isolated private computer communications network, which can be used for computer communications between computer 102a and computer 102b.

API endpoint component 114 can comprise an interface that interacts with automated validation of REST API component 106 in the course of implementing an API on computer 102b. For example, this API can comprise a storage API, where API endpoint component 114 can process a PUT command to store data on computer 102b and a GET command to retrieve data that is stored on computer 102b.

Automated validation of REST API component 106 can comprise a component that generates test cases for the API of API endpoint component 114, and tests API endpoint component 114. In the course of testing API endpoint component 114, automated validation of REST API component 106 can utilize API definition 108, rule definition 110, and dependencies definition 112.

API definition 108 can be similar to API definition 300 of FIG. 3. Rule definition 110 can be similar to rule definition 400 of FIG. 4. Dependencies definition 112 can be similar to dependencies definition 600 of FIG. 6. Automated validation of REST API component 106 can process this stored information, and from it produce test cases that can be similar to test cases 700 of FIG. 7. Automated validation of REST API component 106 can then invoke these test cases by communicating with API endpoint component 114 to validate functionality of API endpoint component 114.

Figure 2:
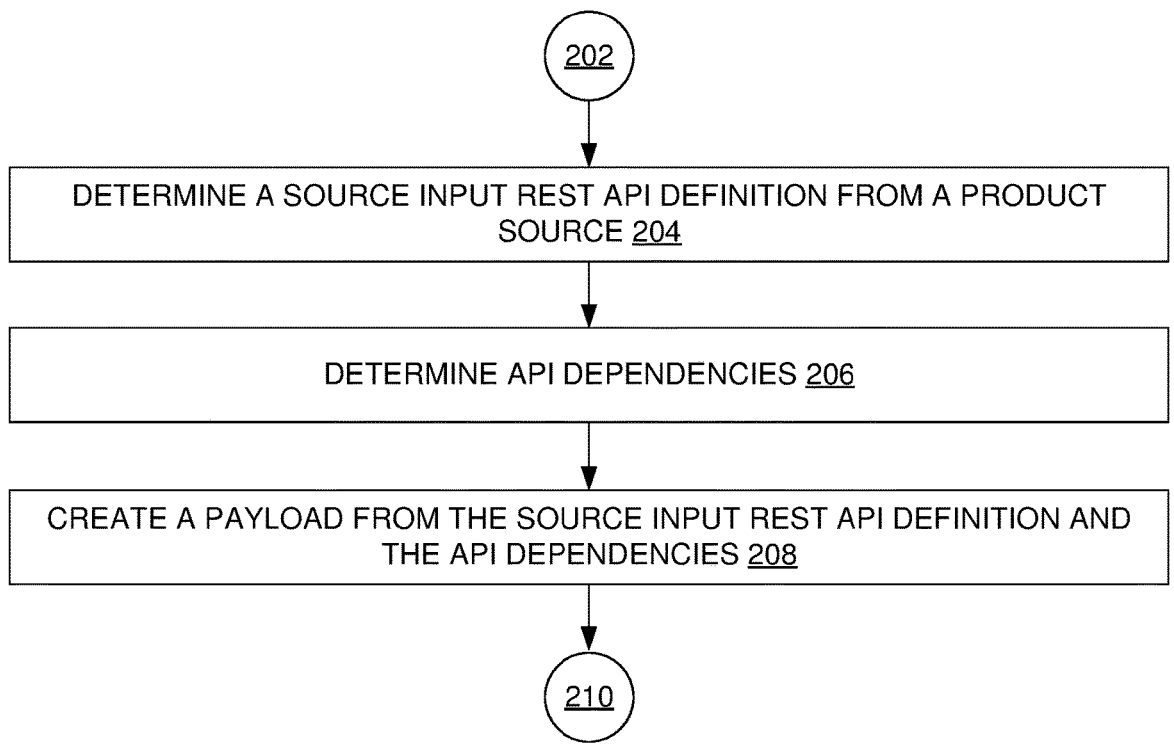
FIG. 2 illustrates an example process flow for payload generation to facilitate automated validation of a REST API, in accordance with an embodiment of this disclosure.
Figure 5:
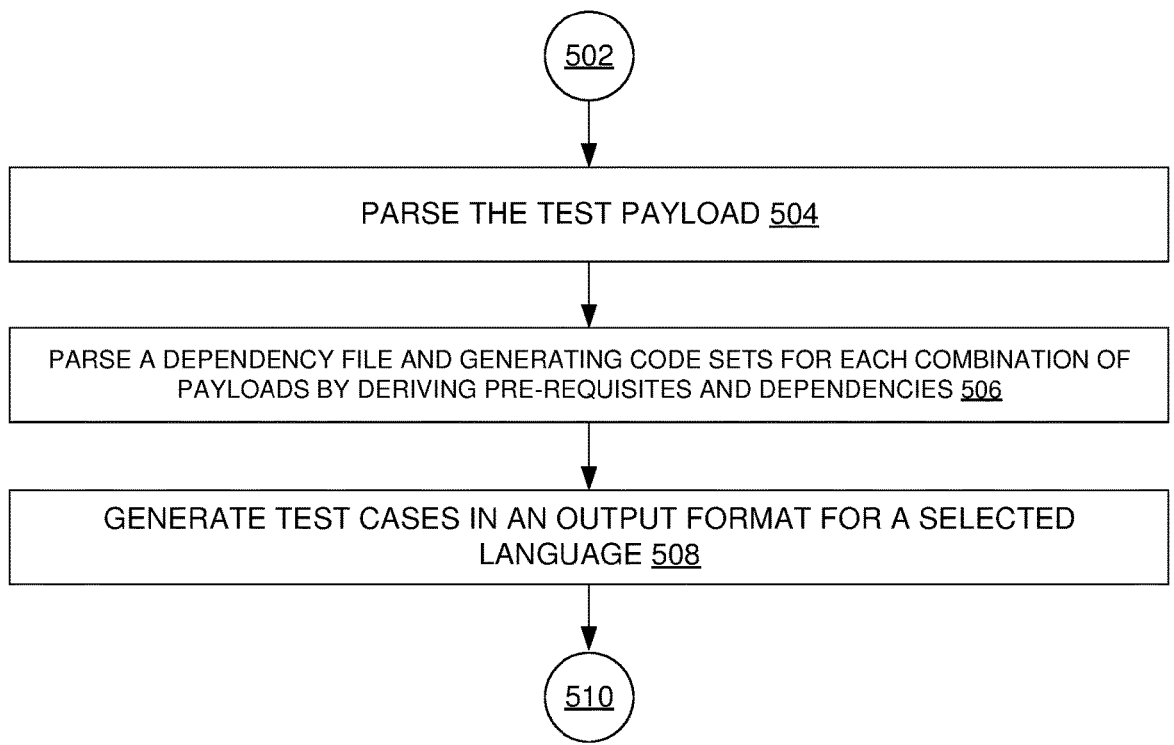
FIG. 5 illustrates an example process flow for test case generation to facilitate automated validation of a REST API, in accordance with an embodiment of this disclosure.
Figure 8:
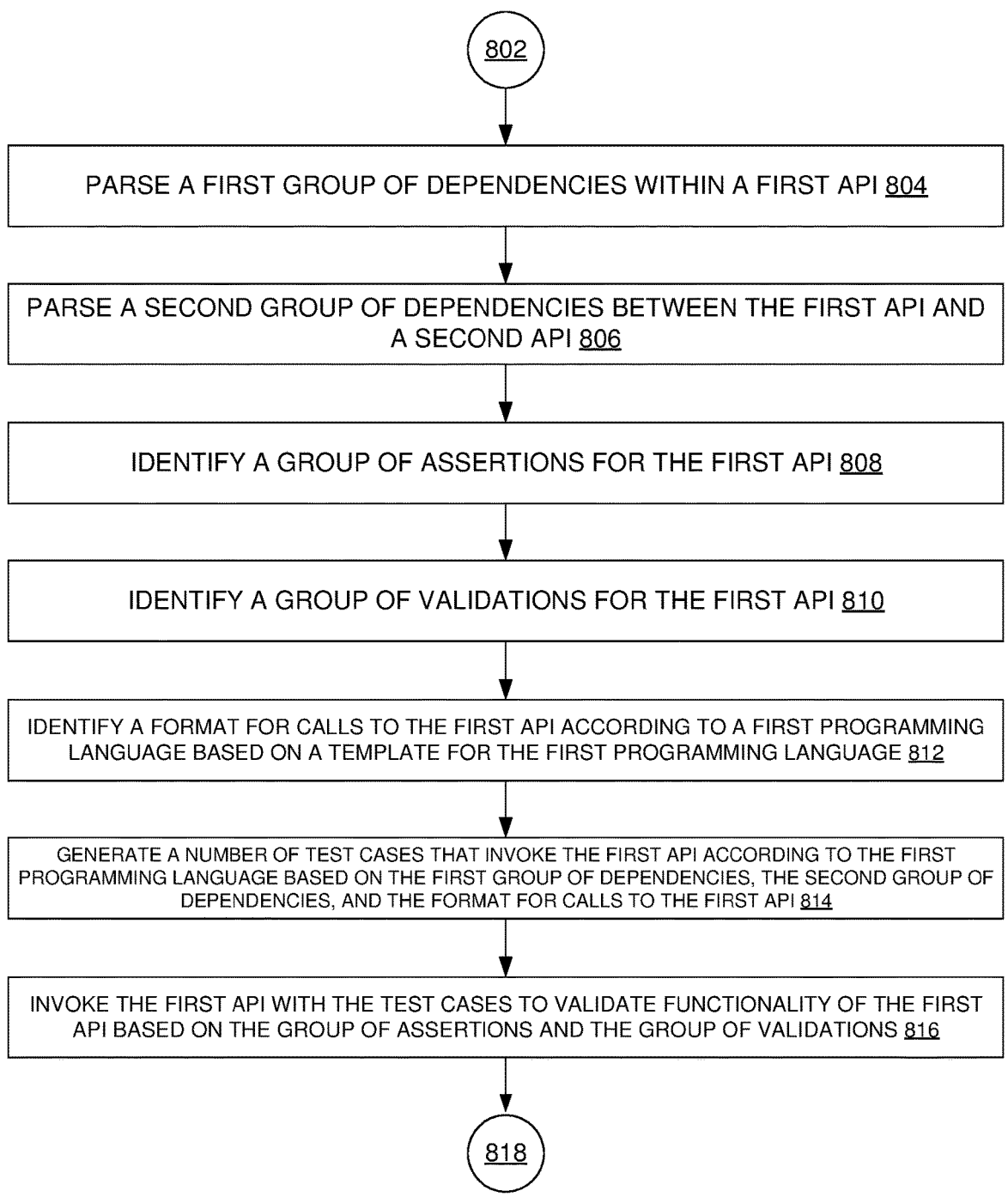
FIG. 8 illustrates an example process flow to facilitate automated validation of a REST API, in accordance with an embodiment of this disclosure.
Figure 9:
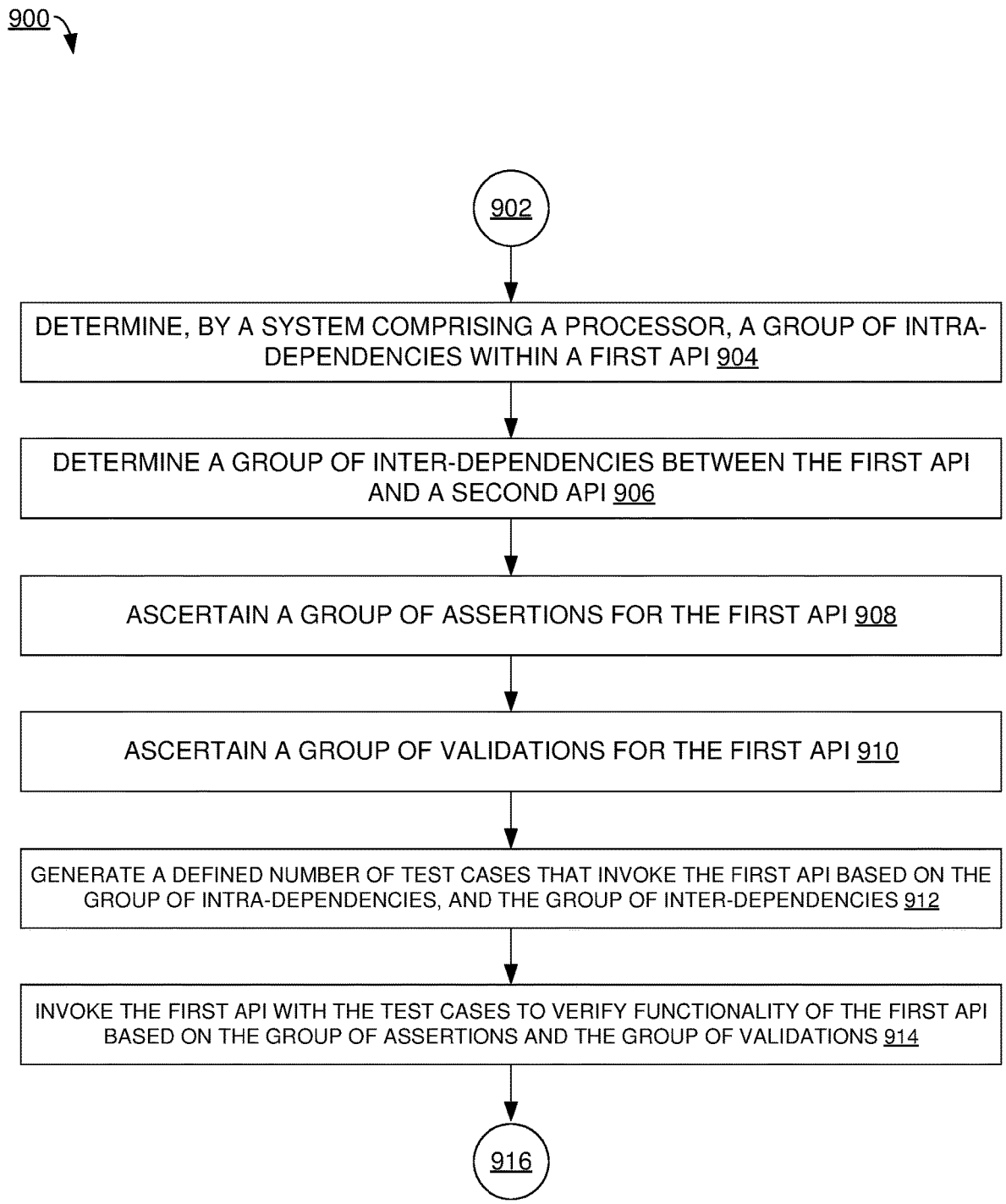
FIG. 9 illustrates another example process flow to facilitate automated validation of a REST API, in accordance with an embodiment of this disclosure.
Figure 10:
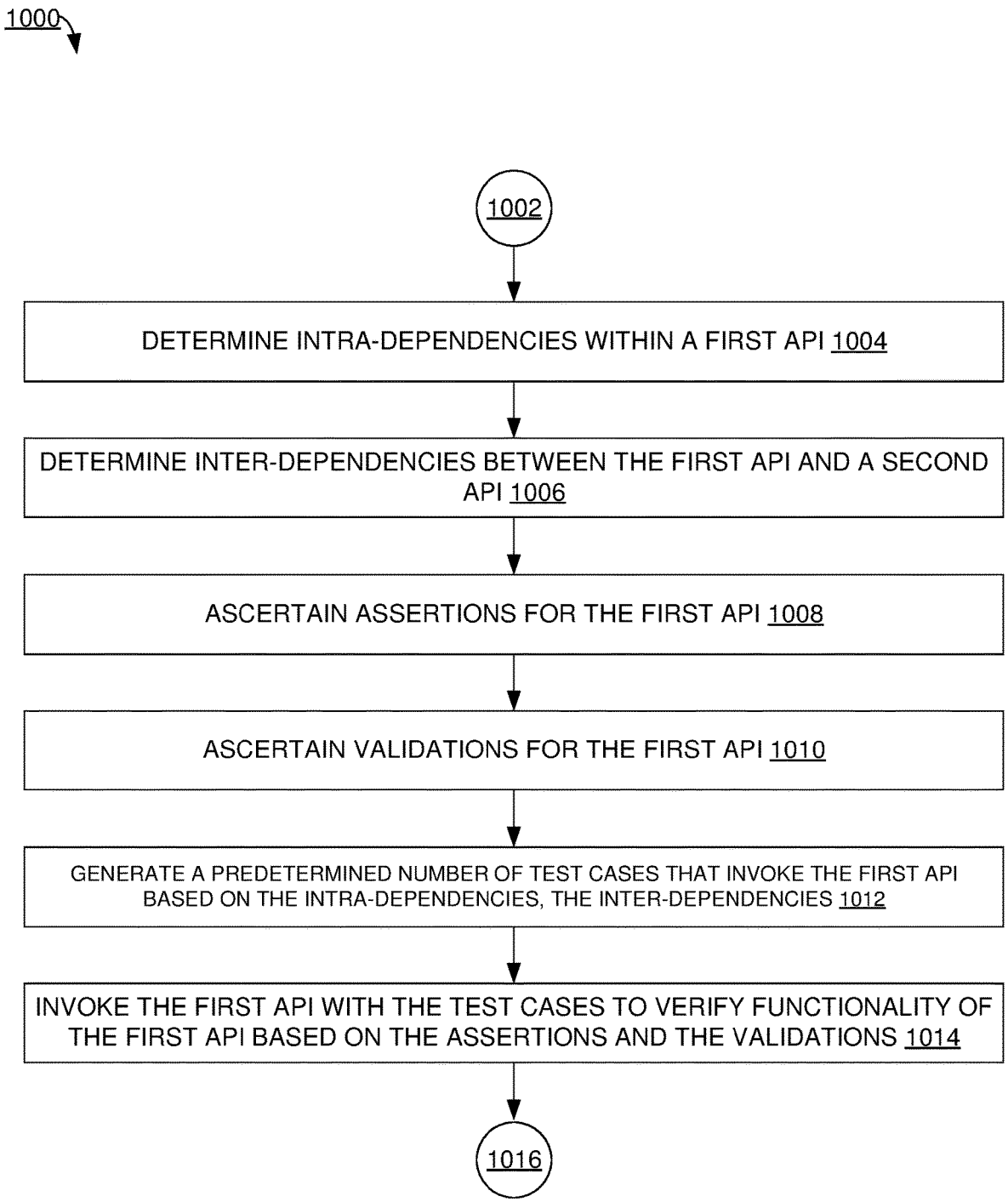
FIG. 10 illustrates another example process flow to facilitate automated validation of a REST API, in accordance with an embodiment of this disclosure.

In the course of implementing automated validation of REST APIs, automated validation of REST API component 106 can implement part(s) of process flow 200 of FIG. 2, process flow 500 of FIG. 5, process flow 800 of FIG. 8, process flow 900 of FIG. 9, and/or process flow 1000 of FIG. 10.

Example Process Flows and Definitions

FIG. 2 illustrates an example process flow 200 for payload generation to facilitate automated validation of a REST API, in accordance with an embodiment of this disclosure. In some examples, one or more embodiments of process flow 200 can be implemented by automated validation of REST API component 106 of FIG. 1, or computing environment 1100 of FIG. 11.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 500 of FIG. 5, process flow 800 of FIG. 8, process flow 900 of FIG. 9, and/or process flow 1000 of FIG. 10.

Process flow 200 begins with 202, and moves to operation 204. Operation 204 depicts determining a source input REST API definition from a product source. In some examples, the source input REST API definition can be API definition 300 of FIG. 3.

In some examples, the input definition source can be in a markup document format (e.g., a YAML format, or a JSON format). The input definition source can provide a rule format for a pre-defined rule set. Rule definitions in a rule set can provide product awareness and exceptions.

After operation 204, process flow 200 moves to operation 206.

Operation 206 depicts determining API dependencies. In some examples, the API dependencies of operation 206 can be determined from rule definition 400 of FIG. 4.

The API dependencies can comprise intra-API dependencies. These dependencies can include intra-parameter dependencies. An example of an intra-parameter dependency can be a Lightweight Directory Access Protocol (LDAP) configuration that requires an additional Bind-DN (an object that is bound inside LDAP used to obtain an identity to perform certain LDAP operations) as mandatory. These intra-API dependencies can also include exception handlers, such as for passwords or timestamps.

After operation 206, process flow 200 moves to operation 208.

Operation 208 depicts creating a payload from the source input REST API definition and the API dependencies. Operation 208 can comprise parsing the API definition by applying the rule sets derived from the source input REST API definition to develop a set of combinatorial payloads in a known format for testing the API. In some examples, the known format can comprise a JSON format.

The derived combinatorial payloads can include aspects such as the following. The aspects of the payloads can include a definition of a test type in positive, negative, and boundary conditions, data types, and response codes for one or more parameters, payloads, and/or property sets. The aspects of the payloads can define CRUD operations for each parameter, payload, and/or property set. Additional operations that are applicable to REST techniques can also be defined. The aspects of the payloads can include, for each payload, a combination of key-value pairs, such as in a JSON format. The aspects of the payloads can be derived in a deterministic or a non-deterministic manner to generate multiple combinations of pairs. The aspects of the payloads can include parameters that are non-processable, such as due to missing properties or shortcomings with a file format (such as a YAML format), and can be captured for manual inspection.

After operation 208, process flow 200 moves to 210, where process flow 200 ends. A result of implementing process flow 200 can be to create test payloads for an API based on an API definition and a rule definition. A test payload generated from process flow 200 can be utilized in process flow 500 for test case generation in the course of automated validation of a REST API.

FIG. 3 illustrates an example API definition 300 to facilitate automated validation of a REST API, in accordance with an embodiment of this disclosure. As depicted, API definition 300 can express:

Description: Attributes for the create operation.
type: object
required: [nas_server_id, ip_address, prefix_length]
properties:
nas_server_id:
type: string
description: Unique identifier of the NAS server to which the network interface belongs, as defined by the nas_server resource type.
ip_address:
type: string
format: ip-address
minLength: 1
maxLength: 45

API definition 300 can be utilized by operation 204 of process flow 200 as a source input REST API definition.

FIG. 4 illustrates an example rule definition 400 to facilitate automated validation of a REST API, in accordance with an embodiment of this disclosure. As depicted, rule definition 400 can express:

```
{
  "testbed": {
    "file_interface": {
      "ip_address": {
```

```
            "path": "trident_sdnas_interface",
            "value": "ipv4_address"
        },
        "prefix_length": {
            "path": "trident_sdnas_interface",
            "value": "prefix_length"
        },
        "gateway": {
            "path": "trident_sdnas_interface",
            "value": "ipv4_gateway"
        },
    },
}
```

API definition 400 can be utilized by operation 204 of process flow 200 as a source input REST API definition.

FIG. 5 illustrates an example process flow 500 for test case generation to facilitate automated validation of a REST API, in accordance with an embodiment of this disclosure. In some examples, one or more embodiments of process flow 500 can be implemented by automated validation of REST API component 106 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 200 of FIG. 2, process flow 800 of FIG. 8, process flow 900 of FIG. 9, and/or process flow 1000 of FIG. 10.

Process flow 500 begins with 502, and moves to operation 504. Operation 504 depicts parsing the test payload. In some examples, the test payload can be a test payload generated by implementing process flow 200 of FIG. 2. In some examples, the test payload can be in a JSON format.

After operation 504, process flow 500 moves to operation 506.

Operation 506 depicts parsing a dependency file and generating code sets for each combination of payloads by deriving pre-requisites and dependencies. In some examples, the dependency file of operation 506 can be dependencies definition 600 of FIG. 6. In some examples, the dependency file can be a REST dependency file. In some examples, the dependency file can be in a JSON format.

After operation 506, process flow 500 moves to operation 508.

Operation 508 depicts generating test cases in an output format for a selected language. In some examples, operation 508 can be customizable for different frameworks and/or programming languages. In some examples, different programming languages can invoke a particular API using different calls.

For example, the same API call can be expressed differently in a C programming language and a JavaScript programming language. In such examples, in operation 508 a test case can be generated according to a specified programming language. In some examples, the programming language is specified according to received user input.

After operation 508, process flow 500 moves to 510, where process flow 500 ends. A result of implementing process flow 500 can be to produce test cases for API calls for an API. These test cases can then be used to test the API.

FIG. 6 illustrates an example dependencies definition 600 to facilitate automated validation of a REST API, in accordance with an embodiment of this disclosure. As depicted, dependencies definition 600 can express:

```
{
    "NasServer": "",
    "FileInterface": "NasServer",
    "FileSystem": "NasServer ",
    "snapshot": "NasServer, FileSystem",
    "NfsServer": "NasServer",
    "FileLdap": "NasServer",
    "FileDns": "NasServer",
    "SmbServer": "NasServer, FileSystem"
},
```

Dependencies definition 600 can be utilized by operation 506 of FIG. 5 as a dependency file.

FIG. 7 illustrates example test cases 700 to facilitate automated validation of a REST API, in accordance with an embodiment of this disclosure. As depicted, test cases 700 can express:

```
############# START: Test Scenario 1 #############
self.file_interface_params = FileInterfaceParam( )
self.file_interface_params.set_params(vlan_id = "vlan",
    ip_address = "ip_address",
        prefix_length = "prefix_length")
        self.objects_dict =
self.object_creator.trident_object_creator(nas_server_params=self.nas_server_params
file_interface_params = self.file_interface_params)
LOGGER.info(self.objects_dict)
self.objects_dict["file_interface"].delete( )
####### END: Test Scenario #############
####### START: Test Scenario 2 #############
self.file_interface_params = FileInterfaceParam( )
    self.file_interface_params.set_params(ip_address = "ip_address",
    gateway = gateway",
    prefix_length = "prefix_length")
self.objects_dict =
self.object_creator.trident_object_creator(nas_server_params=self.nas_server_params
,
    file_interface_params = self.file_interface_params)
    LOGGER.info(self.objects_dict)
    self.objects_dict["file_interface"].delete( )
####### END: Test Scenario #############
```

In some examples test cases 700 can be the test cases generated in operation 508 of FIG. 5.

FIG. 8 illustrates an example process flow 800 to facilitate automated validation of a REST API, in accordance with an embodiment of this disclosure. In some examples, one or more embodiments of process flow 800 can be implemented by automated validation of REST API component 106 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 500 of FIG. 5, process flow 900 of FIG. 9, and/or process flow 1000 of FIG. 10.

Process flow 800 begins with 802, and moves to operation 804. Operation 804 depicts parsing a first group of dependencies within a first API. The first group of dependencies can be intra-API dependencies as described herein.

After operation 804, process flow 800 moves to operation 806.

Operation 806 depicts parsing a second group of dependencies between the first API and a second API. The second group of dependencies can be inter-API dependencies as described herein.

After operation 806, process flow 800 moves to operation 808.

Operation 808 depicts identifying a group of assertions for the first API. In some examples, an assertion of the group of assertions specifies a mandatory parameter and an expected response for a first test case of the test cases. That is, assertions can define how a particular API call is to be made, and what response should be received based on making that API call.

After operation 808, process flow 800 moves to operation 810.

Operation 810 depicts identifying a group of validations for the first API. A validation can comprise an API call that confirms that a prior API call was implemented successfully. For example, where the prior API call was to store data on a server at a known location, the validation can be to retrieve data from the server at that known location and verify that it is the data that was stored in the prior API call.

After operation 810, process flow 800 moves to operation 812.

Operation 812 depicts identifying a format for calls to the first API according to a first programming language based on a template for the first programming language. One particular API call can be invoked by programs written in a variety of different programming languages. Each of these programming languages can have a different format for making that particular API call. In operation 812, a language to use can be determined (such as based on received user input), and a template for that programming language can be utilized to generate the particular API call in that programming language.

After operation 812, process flow 800 moves to operation 814.

Operation 814 depicts generating a number of test cases that invoke the first API according to the first programming language based on the first group of dependencies, the second group of dependencies, and the format for calls to the first API.

In some examples, the test cases comprise a first API call, and a validation of the group of validations comprises a second API call that produces a result that confirms that a recipient of the first API call carried out the first API call.

In some examples, a first test case of the test cases comprises a first API call that contains all mandatory parameters for the first API call. That is, a payload can include all mandatory parameters for a given API call.

In some examples, a first test case of the test cases comprises a first API call that omits a mandatory parameter for the first API call. That is, a payload can be missing a mandatory parameter for a given API call.

In some examples, a first test case of the test cases comprises a first API call that contains all optional parameters for the first API call. That is, a payload can include all optional parameters for a given API call.

In some examples, a first test case of the test cases comprises a first API call that contains a parameter for the first API call, the parameter having a value of a maximum permissible value or a minimum permissible value for the parameter. That is, a payload can include a boundary value—a maximum or minimum permissible value for a parameter.

After operation 814, process flow 800 moves to operation 816.

Operation 816 depicts invoking the first API with the test cases to validate functionality of the first API based on the group of assertions and the group of validations.

After operation 816, process flow 800 moves to 818, where process flow 800 ends.

FIG. 9 illustrates another example process flow 900 to facilitate automated validation of a REST API, in accordance with an embodiment of this disclosure. In some examples, one or more embodiments of process flow 900 can be implemented by automated validation of REST API component 106 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 500 of FIG. 5, process flow 800 of FIG. 8, and/or process flow 1000 of FIG. 10.

Process flow 900 begins with 902, and moves to operation 904. Operation 904 depicts determining a group of intra-dependencies within a first API. In some examples, operation 904 can be implemented in a similar manner as operation 804 of FIG. 8.

After operation 904, process flow 900 moves to operation 906.

Operation 906 depicts determining a group of inter-dependencies between the first API and a second API. In some examples, operation 906 can be implemented in a similar manner as operation 806 of FIG. 8.

After operation 906, process flow 900 moves to operation 908.

Operation 908 depicts ascertaining a group of assertions for the first API. In some examples, operation 908 can be implemented in a similar manner as operation 808 of FIG. 8.

In some examples, operation 908 comprises determining that a first parameter specified in the group of assertions is non-processable as a result of a missing property, and storing an indication of the first parameter as being non-processable, wherein the generating of the defined number of test cases is independent of the first parameter. That is, there can be a case where there are parameters that are non-processable due to missing properties. These parameters can be captured for manual inspection, which can result in a defect.

After operation 908, process flow 900 moves to operation 910.

Operation 910 depicts ascertaining a group of validations for the first API. In some examples, operation 910 can be implemented in a similar manner as operation 810 of FIG. 8.

After operation 910, process flow 900 moves to operation 912.

Operation 912 depicts generating a defined number of test cases that invoke the first API based on the group of intra-dependencies, and the group of inter-dependencies. In some examples, operation 912 can be implemented in a similar manner as operation 814 of FIG. 8.

In some examples, operation 912 comprises determining a specified output computer language for generating test cases, and wherein the generating of the defined number of test cases comprises generating the defined number of test cases to adhere to a format of the specified output computer language. That is, test cases can be generated in an output format for a specific programming language so that they can be invoked by a program written in that language.

In some examples, operation 912 comprises generating a combination of key-value pairs for a payload of the defined number of test cases. That is, for each payload, a combination of key-value pairs can be defined. In some examples, operation 912 comprises generating the combination of key-value pairs non-deterministically, or generating the combination of key-value pairs deterministically.

In some examples, generating of the defined number of test cases is based on a create, read, update, and delete function for a parameter, a payload, or a property of the group of assertions. That is, each CRUD operation can be defined for each set of parameters, payloads, and properties.

After operation 912, process flow 900 moves to operation 914.

Operation 914 depicts invoking the first API with the test cases to verify functionality of the first API based on the group of assertions and the group of validations. In some examples, operation 914 can be implemented in a similar manner as operation 816 of FIG. 8.

After operation 914, process flow 900 moves to 916, where process flow 900 ends.

FIG. 10 illustrates another example process 1000 flow to facilitate automated validation of a REST API, in accordance with an embodiment of this disclosure. In some examples, one or more embodiments of process flow 1000 can be implemented by automated validation of REST API component 106 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 500 of FIG. 5, process flow 800 of FIG. 8, and/or process flow 900 of FIG. 9.

Process flow 1000 begins with 1002, and moves to operation 1004. Operation 1004 depicts determining intra-dependencies within a first API. In some examples, operation 1004 can be implemented in a similar manner as operation 804 of FIG. 8.

After operation 1004, process flow 1000 moves to operation 1006.

Operation 1006 depicts determining inter-dependencies between the first API and a second API. In some examples, operation 1006 can be implemented in a similar manner as operation 806 of FIG. 8.

After operation 1006, process flow 1000 moves to operation 1008.

Operation 1008 depicts ascertaining assertions for the first API. In some examples, operation 1008 can be implemented in a similar manner as operation 808 of FIG. 8.

In some examples, an assertion of the assertions defines a valid response to invoking the first API with a test case of the test cases, and wherein the assertion comprises a supported property or method of the first API.

In some examples, an assertion of the assertions defines a valid response to invoking the first API with a test case of the test cases, and wherein the assertion comprises a data type of the first API, or an attribute value length of the first API.

In some examples, an assertion of the assertions defines a valid response to invoking the first API with a test case of the test cases, and wherein the assertion comprises an attribute value range or an attribute value boundary of the first API.

In some examples, an assertion of the assertions defines a valid response to invoking the first API with a test case of the test cases, and wherein the assertion comprises a response code for a response type of the first API.

In some examples, an assertion of the assertions defines a valid response to invoking the first API with a test case of the test cases, and wherein the assertion comprises an attribute dependency of the first API.

After operation 1008, process flow 1000 moves to operation 1010.

Operation 1010 depicts ascertaining validations for the first API. In some examples, operation 1010 can be implemented in a similar manner as operation 810 of FIG. 8.

After operation 1010, process flow 1000 moves to operation 1012.

Operation 1012 depicts generating a predetermined number of test cases that invoke the first API based on the intra-dependencies, the inter-dependencies. In some examples, operation 1012 can be implemented in a similar manner as operation 814 of FIG. 8.

After operation 1012, process flow 1000 moves to operation 1014.

Operation 1014 depicts invoking the first API with the test cases to verify functionality of the first API based on the assertions and the validations. In some examples, operation 1014 can be implemented in a similar manner as operation 816 of FIG. 8.

After operation 1014, process flow 1000 moves to 1016, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of computer 102a and/or computer 102b of FIG. 1.

In some examples, computing environment 1100 can implement one or more embodiments of the process flows of FIGS. 2, 5, and/or 8-10 to facilitate automated validation of a REST API.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
parsing a first group of dependencies within a first application programming interface (API);
parsing a second group of dependencies between the first API and a second API;
identifying a group of assertions for the first API;
identifying a group of validations for the first API;
identifying a format for calls to the first API according to a first programming language based on a template for the first programming language;
generating a number of test cases that invoke the first API according to the first programming language based on the first group of dependencies, the second group of dependencies, and the format for calls to the first API; and
invoking the first API with the test cases to validate functionality of the first API based on the group of assertions and the group of validations.

2. The system of claim 1, wherein an assertion of the group of assertions specifies a mandatory parameter and an expected response for a first test case of the test cases.

3. The system of claim 1, wherein the test cases comprise a first API call, and wherein a validation of the group of validations comprises a second API call that produces a result that confirms that a recipient of the first API call carried out the first API call.

4. The system of claim 1, wherein a first test case of the test cases comprises a first API call that contains all mandatory parameters for the first API call.

5. The system of claim 1, wherein a first test case of the test cases comprises a first API call that omits a mandatory parameter for the first API call.

6. The system of claim 1, wherein a first test case of the test cases comprises a first API call that contains all optional parameters for the first API call.

7. The system of claim 1, wherein a first test case of the test cases comprises a first API call that contains a parameter for the first API call, the parameter having a value of a maximum permissible value or a minimum permissible value for the parameter.

8. A method, comprising:
determining, by a system comprising a processor, a group of intra-dependencies within a first application programming interface (API);
determining, by the system, a group of inter-dependencies between the first API and a second API;
ascertaining, by the system, a group of assertions for the first API;
ascertaining, by the system, a group of validations for the first API;
generating, by the system, a defined number of test cases that invoke the first API based on the group of intra-dependencies, and the group of inter-dependencies; and
invoking, by the system, the first API with the test cases to verify functionality of the first API based on the group of assertions and the group of validations.

9. The method of claim 8, further comprising:
determining, by the system, a specified output computer language for generating test cases; and
wherein the generating of the defined number of test cases comprises generating the defined number of test cases to adhere to a format of the specified output computer language.

10. The method of claim 8, further comprising:
generating, by the system, a combination of key-value pairs for a payload of the defined number of test cases.

11. The method of claim 10, further comprising:
generating the combination of key-value pairs non-deterministically.

12. The method of claim 10, further comprising:
generating the combination of key-value pairs deterministically.

13. The method of claim 8, further comprising:
determining that a first parameter specified in the group of assertions is non-processable as a result of a missing property; and
storing an indication of the first parameter as being non-processable, wherein the generating of the defined number of test cases is independent of the first parameter.

14. The method of claim 8, wherein the generating of the defined number of test cases is based on a create, read, update, and delete function for a parameter, a payload, or a property of the group of assertions.

15. A non-transitory computer-readable medium comprising instructions that, in response to execution, cause a system comprising a processor to perform operations, comprising:
determining intra-dependencies within a first application programming interface (API);
determining inter-dependencies between the first API and a second API;
ascertaining assertions for the first API;
ascertaining validations for the first API;
generating a predetermined number of test cases that invoke the first API based on the intra-dependencies, the inter-dependencies; and
invoking the first API with the test cases to verify functionality of the first API based on the assertions and the validations.

16. The non-transitory computer-readable medium of claim 15, wherein an assertion of the assertions defines a valid response to invoking the first API with a test case of the test cases, and wherein the assertion comprises a supported property or method of the first API.

17. The non-transitory computer-readable medium of claim 15, wherein an assertion of the assertions defines a valid response to invoking the first API with a test case of the test cases, and wherein the assertion comprises a data type of the first API, or an attribute value length of the first API.

18. The non-transitory computer-readable medium of claim 15, wherein an assertion of the assertions defines a valid response to invoking the first API with a test case of the test cases, and wherein the assertion comprises an attribute value range or an attribute value boundary of the first API.

19. The non-transitory computer-readable medium of claim 15, wherein an assertion of the assertions defines a valid response to invoking the first API with a test case of the test cases, and wherein the assertion comprises a response code for a response type of the first API.

20. The non-transitory computer-readable medium of claim 15, wherein an assertion of the assertions defines a valid response to invoking the first API with a test case of the test cases, and wherein the assertion comprises an attribute dependency of the first API.

* * * * *